P. S. LONVIERE.
CLOTHESPIN.
APPLICATION FILED NOV. 16, 1920.
1,372,524.
Patented Mar. 22, 1921.
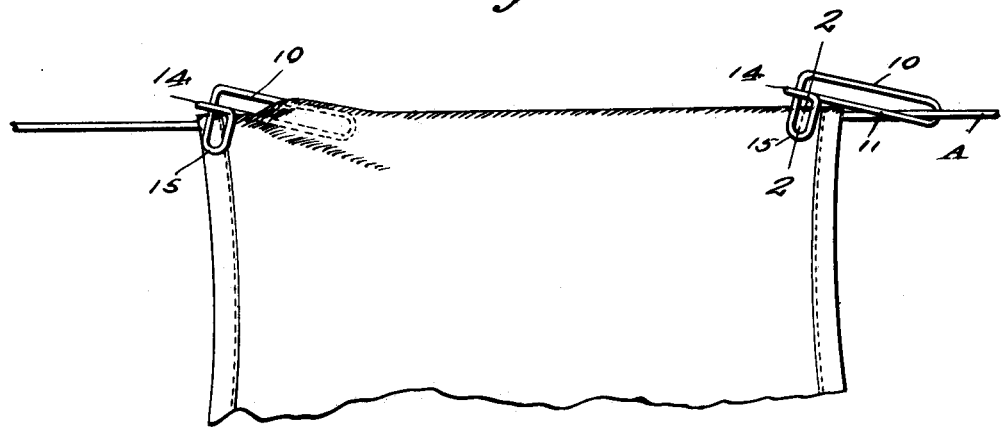
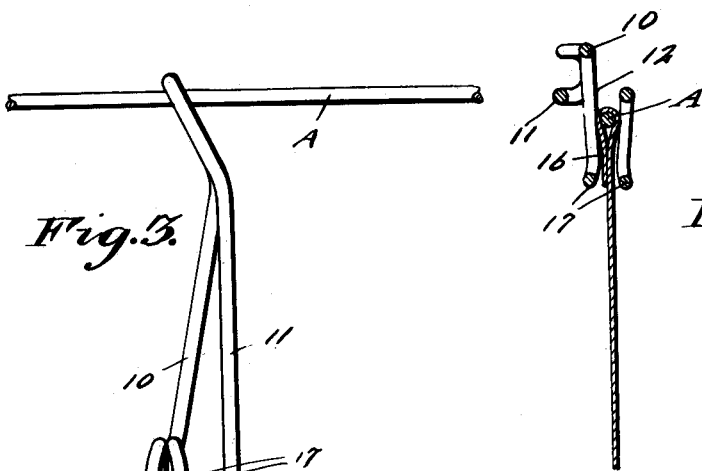
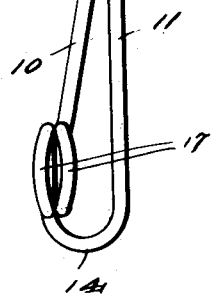
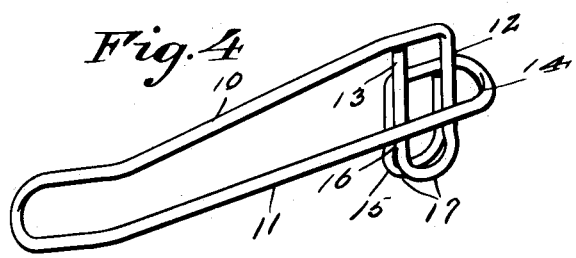
P. S. Lonviere
INVENTOR

UNITED STATES PATENT OFFICE.

PAUL SAMUEL LONVIERE, OF UNION, LOUISIANA.

CLOTHESPIN.

1,372,524.      Specification of Letters Patent.      Patented Mar. 22, 1921.

Application filed November 16, 1920. Serial No. 424,401.

*To all whom it may concern:*

Be it known that I, PAUL SAMUEL LONVIERE, a citizen of the United States, residing at Union, in the parish of St. James and State of Louisiana, have invented new and useful Improvements in Clothespins, of which the following is a specification.

This invention comprehends the provision of a wire clothes pin, designed to effectively engage the clothes line in a manner to retain its position thereon and thereby prevent the clothes from being blown from the line by strong winds.

Another object of the invention resides in the provision of a pin of the above mentioned character formed to provide a line receiving loop by means of which the pin is suspended from the line when not in use thereby preventing losing of the pin.

The nature and advantages of the invention will be better understood when the following detailed description is read in connection with the accompanying drawing, the invention residing in the construction, combination and arrangement of parts as claimed.

In the drawings forming part of this application like characters of reference denote similar parts in the several views, and wherein:

Figure 1 is a view showing the pin in its applied position on the line.

Fig. 2 is a sectional view taken on line 2—2 of Fig. 1.

Fig. 3 is a view showing the pin suspended from the line when not in use.

Fig. 4 is a perspective view of the pin removed from the line.

The pin forming the subject matter of my invention is formed from a single strand of resilient wire which is bent at an appropriate point in its length to provide a line receiving loop by means of which the pin is suspended from the line when not in use as clearly shown in Fig. 3. The limbs 10 and 11 of this loop are substantially co-extensive in length, the limb 10 being bent at a right angle as at 12 and then extended upwardly as at 13 to provide a substantially U-shaped extremity. The adjacent extremity of the limb 11 is curved to the U-shaped portion of the limb 10 as at 14, and terminates to provide a U-shaped portion 15 arranged in juxtaposition to the U-shaped terminal of the limb 10. These U-shaped portions normally contact each other at a point indicated at 16, while the corresponding closed ends of said portions are flared outward, as at 17 to facilitate the application of the pin to the line A.

The pin is normally suspended from the line by means of the loop as shown in Fig. 3 so that the pin cannot be lost and is always in a position to be readily applied to the line when its use is desired. To apply the pin to the line in an active position, it is only necessary to swing the pin to a position substantially parallel with the line as shown in Fig. 1, and position the line between the U-shaped portions above described. When this is arranged, the resiliency of the material from which the pin is constructed, affords the pin an effective purchase upon the line so that the pin can be casually separated therefrom under any conditions.

While it is believed that from the foregoing description the nature and advantages of the invention will be readily understood, I desire to have it known that what is herein shown and described is merely illustrative of one embodiment of the invention to which I do not limit myself, and that such changes may be resorted to when desired as fall within the scope of what is claimed.

What is claimed is:

1. A clothes pin constructed from a single strand of resilient wire bent at an appropriate point in its length to provide a line receiving loop including spaced parallel limbs, one of said limbs terminating to provide a U-shaped portion arranged at a right angle to said limb, the other said limb being curved transversely of said U-shaped portion embracing the latter and terminating to provide a U-shaped portion arranged in juxtaposition to the first mentioned U-shaped portion, said U-shaped portions being normally arranged in contacting relation and having their corresponding lower extremities flared.

2. A clothes pin constructed from a single length of resilient wire bent at an appropriate point in its length to provide a line receiving loop including spaced parallel limbs, one of said limbs terminating to provide an offset U-shaped portion, the other limb being reversely bent and curved about the U-shaped portion at a point between its ends, said curved portion terminating to provide a U-shaped member arranged parallel with the aforementioned U-shaped portion and normally contacting the latter.

In testimony whereof I affix my signature.

PAUL SAMUEL LONVIERE.